Sept. 20, 1960     F. J. SOMES, JR     2,953,626
ELECTRICAL SYSTEM
Original Filed Oct. 13, 1955     3 Sheets-Sheet 2
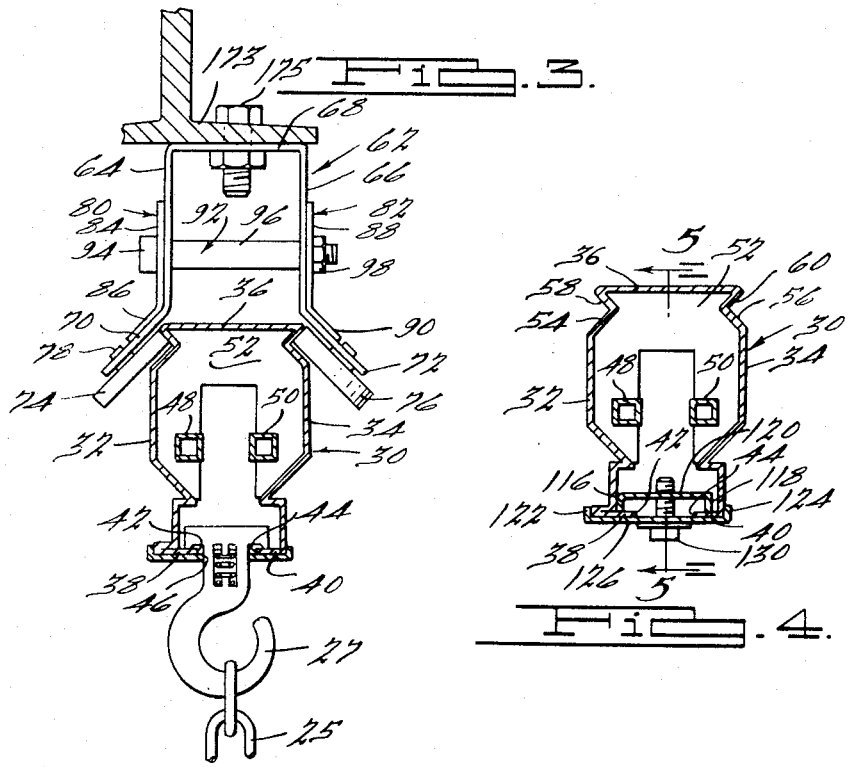
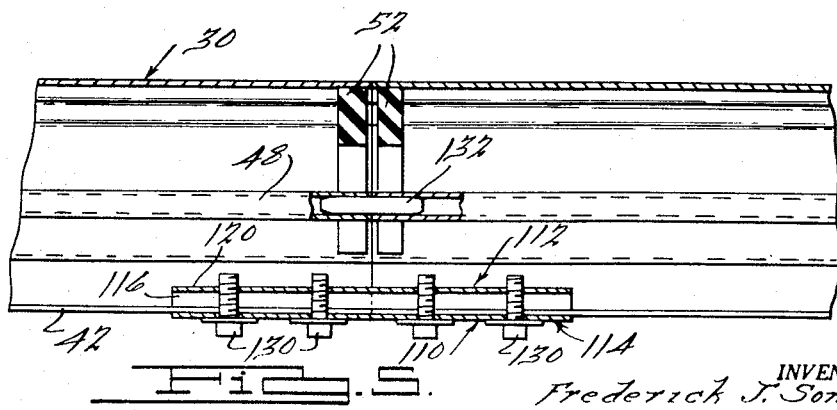
INVENTOR.
Frederick J. Somes, Jr.
BY Robert A. Casey
ATTORNEY Sept. 20, 1960     F. J. SOMES, JR     2,953,626
ELECTRICAL SYSTEM
Original Filed Oct. 13, 1955     3 Sheets-Sheet 3
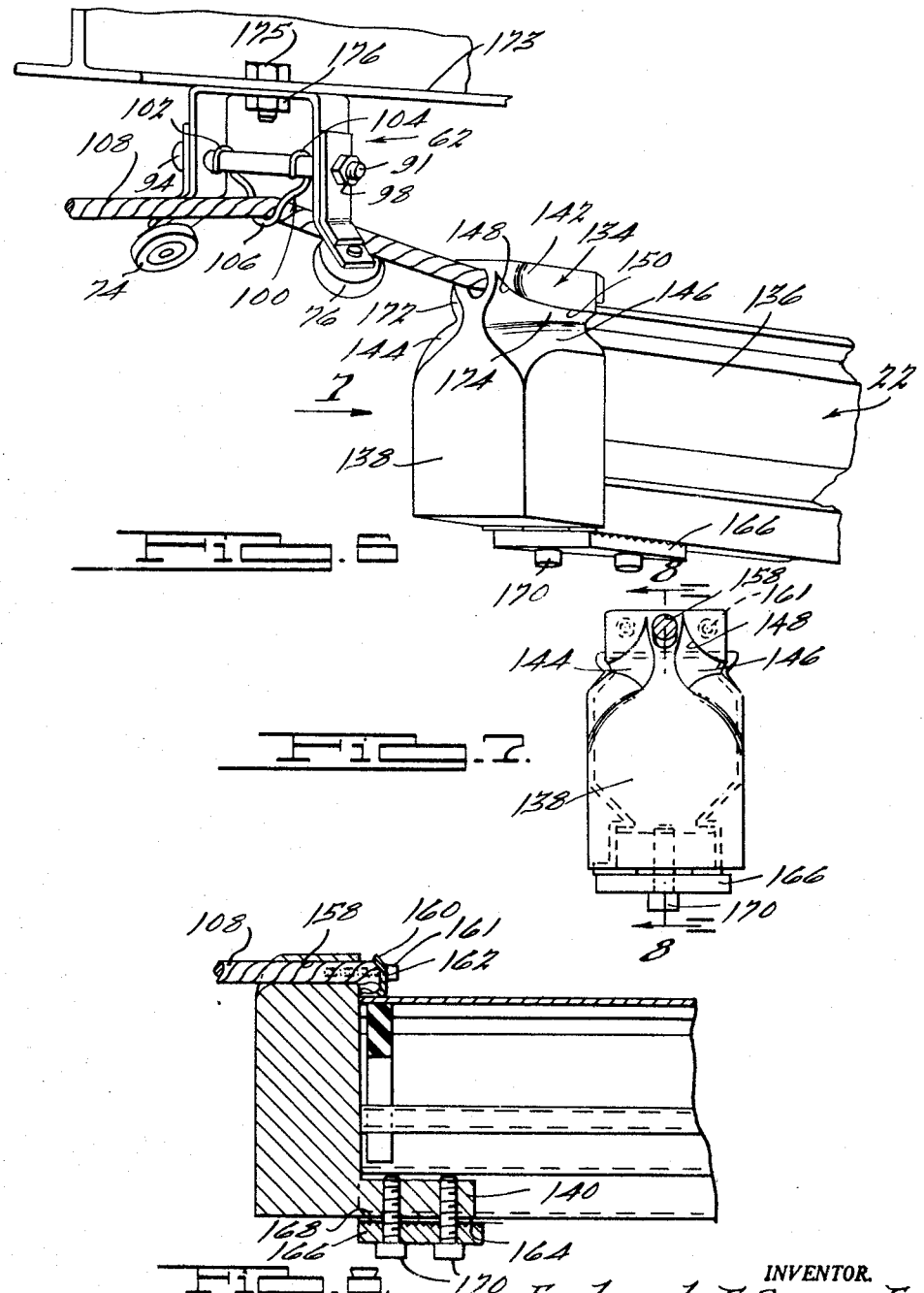

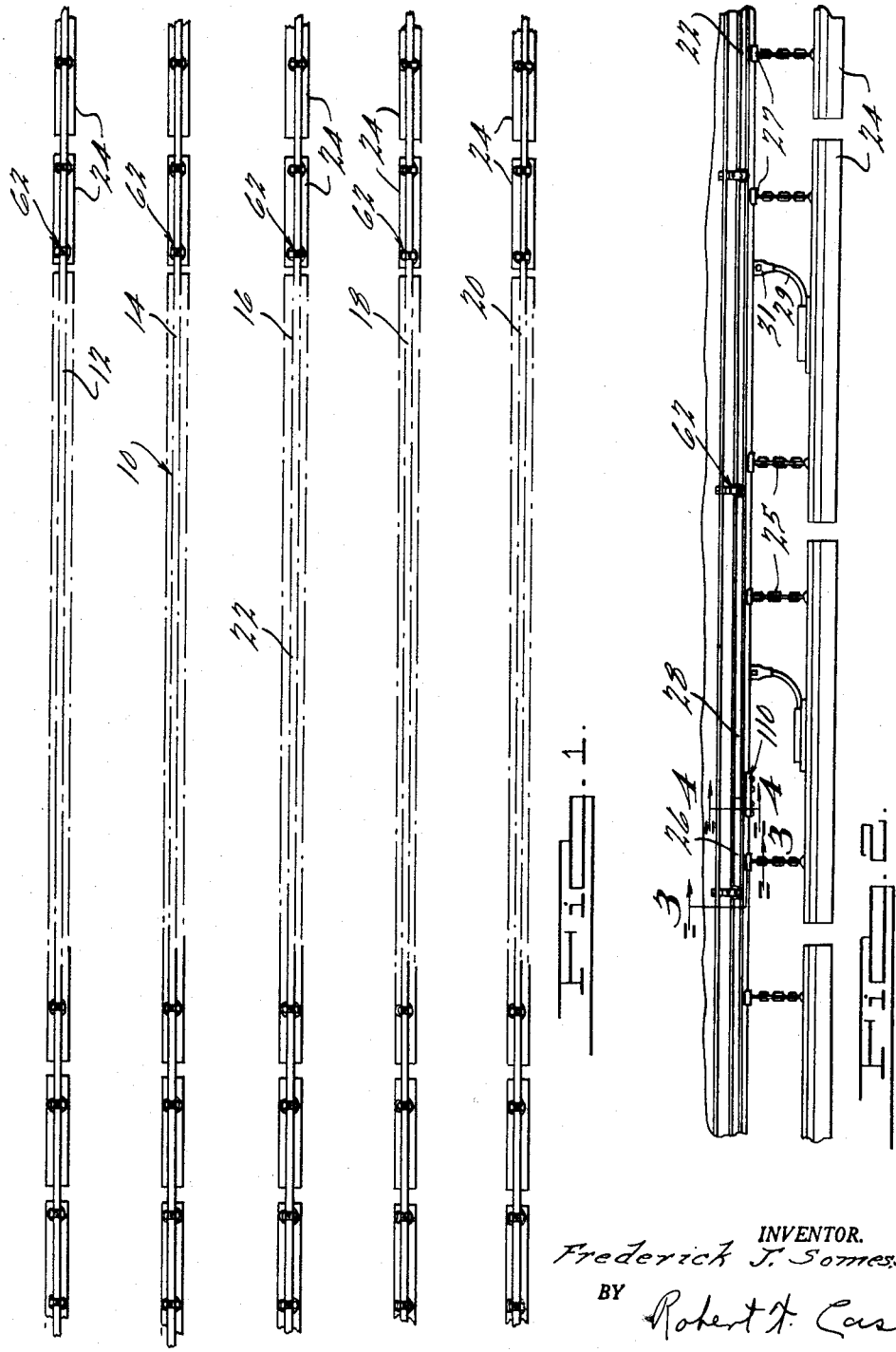

United States Patent Office 2,953,626
Patented Sept. 20, 1960

2,953,626

ELECTRICAL SYSTEM

Frederick J. Somes, Jr., Detroit, Mich., assignor to General Electric Company, a corporation of New York Continuation of abandoned application Ser. No. 540,230, Oct. 13, 1955. This application June 2, 1959, Ser. No. 817,664

7 Claims. (Cl. 174—99)

My invention relates to electrical power distribution systems and methods of installing the same and, more particularly, to improved electrical power distribution apparatus and an improved method of installing the same. This application is a continuation of my earlier filed application Serial No. 540,230, filed October 13, 1955, entitled "Electrical System," now abandoned.

An object of the invention is to reduce the time, labor and expense of installing electrical power distribution systems.

Another object of the invention is to provide improved electrical power distribution apparatus incorporating improved means for supporting the components thereof.

Another object of the invention is to provide improved electrical power distribution apparatus that is rugged in construction, economical to manufacture and assemble, durable, efficient and reliable in operation.

Another object of the invention is to provide improved apparatus incorporating improved means which facilitates the installation of electrical power distribution systems of any desired size and which materially increases the efficiency of the workman installing the system.

Still another object of the invention is to provide an improved method of installing the components of an electrical power distribution system with a minimum of equipment, labor and expense.

The above as well as other objects and advantages of the present invention will become apparent from the following description, the appended claims and the accompanying drawings wherein:

Figure 1 is a top plan view of electrical power distribution apparatus embodying the present invention, showing the same installed in an electrical power distribution system.

Fig. 2 is an enlarged side elevational view of a portion of the structure illustrated in Figure 1;

Fig. 3 is an enlarged transverse sectional view of the structure illustrated in Fig. 2, taken on the line 3—3 thereof;

Fig. 4 is an enlarged transverse sectional view of the structure illustrated in Fig. 2, taken on the line 4—4 thereof;

Fig. 5 is an enlarged longitudinal sectional view of the structure illustrated in Fig. 4, taken on the line 5—5 thereof;

Fig. 6 is a perspective view of apparatus embodying the present invention, showing the same during the installation thereof;

Fig. 7 is a front elevational view of a portion of the apparatus illustrated in Fig. 6; and Fig. 8 is a fragmentary longitudinal sectional view of the structure illustrated in Fig. 7, taken on the line 8—8 thereof.

In general, the method of installing the electrical power distribution apparatus of the present invention includes the steps of electrically and mechanically joining a plurality of initially separate sections of a trolley duct in end-to-end relationship to form an elongate unitary structure, the sections being joined at a particular location, such as at one end of a proposed bus way, moving the joined sections a predetermined distance along a predetermined path, rotatably supporting said joined sections at predetermined spaced intervals, and thereafter successively electrically and mechanically joining additional sections in end-to-end relationship with respect to the previously joined sections, moving the joined sections a predetermined distance along said predetermined path, and rotatably supporting said joined sections at predetermined spaced intervals until all of the desired sections have been electrically and mechanically connected and moved to the desired location. The present invention thus facilitates the rapid installation of a relatively large electrical power distribution system with a minimum of labor, equipment and expense. Furthermore, the method of the present invention materially increases the efficiency of the workman installing the system, thereby increasing the work output rate of the workman and reducing the cost of the system.

Referring to the drawings, and more particularly to Figure 1 thereof, an electrical power distribution system, generally designated 10, is illustrated which is comprised of a plurality of spaced, substantially parallel rows 12, 14, 16, 18 and 20 of trolley ducts 22 that are adapted to supply electrical power to lighting fixtures 24 or other electrical equipment. In the embodiment of the invention illustrated, the fixtures 24 are shown as being suspended by link elements 25 which are secured to the trolley ducts 22 by hooks 27, the fixtures 24 being electrically connected to the trolley ducts 22 by conduits 29 and conventional plugs or trolleys 31. While multiple trolley ducts 22 are illustrated, it will be understood that the present invention may be utilized in the installation of only one trolley duct, if desired. Each of the rows of trolley ducts may, for example, extend for several hundred feet, the electrical power distribution system 10 illustrated being particularly adapted for factories and other relatively large buildings.

In the embodiment of the invention illustrated, each of the trolley ducts 22 includes a plurality of sections, such as 26 and 28, which are electrically and mechanically joined together in end-to-end relationship to form a unitary structure, the individual sections being of any desired or conventional length, as, for example, each section may be approximately ten feet in length.

Each section of the trolley duct 22 includes a housing 30 having spaced side walls 32 and 34 joined by a top wall 36. The lower end portions of the side walls, as viewed in Figs. 3 and 4, are provided with inwardly extending flanges 38 and 40, the inner edges 42 and 44 of which terminate in spaced substantially parallel relationship to define an elongate slot 46. The flanges 38 and 40 serve as tracks which extend longitudinally of the housing 30 from end-to-end thereof and upon which conventional trolleys, plugs or other connectors are mounted in the conventional manner.

The housing 30 carries electrical conductors 48 and 50, the conductors 48 and 50 being disposed in spaced relationship with respect to the walls 32, 34 and 36 of the housing. The conductors are also disposed in inwardly spaced relationship with respect to the flanges 38 and 40, electrical insulators 52 being provided which serve to support the conductors 48 and 50 and electrically insulate the conductors from the housing.

At a position adjacent the top wall 36, the side walls are provided with generally V-sectioned longitudinally extending grooves 54 and 56 which form ways 58 and 60 that are disposed in substantially mutually perpendicular planes. The ways 58 and 60 extend longitudinally of the housing 30 for the entire length thereof and are adapted to engage rotatable supporting elements, as will be described hereinafter in greater detail.

For the purpose of supporting the housing 30, a plurality of generally U-shaped support members 62 are provided, each having spaced flanges 64 and 66 integrally joined by a web 68. The free end portions 70 and 72 of the flanges 64 and 66, respectively, project angularly outwardly in substantially mutually perpendicular planes and carry rotatable supporting elements 74 and 76, the rotatable supporting elements 74 and 76 being journalled on pins 78 fixed to the portions 74 and 76 of the flanges 64 and 66, respectively. As previously mentioned, the rotatable supporting elements 74 and 76 are adapted to engage the ways 58 and 60, respectively, the axis of rotation of the element 74 being substantially parallel to the plane of the way 58 while the axis of rotation of the element 76 is substantially parallel to the way 60.

A pair of stiffening members 80 and 82 are provided on each support member 62. The stiffening member 80 includes an end portion 84 which is disposed in substantially parallel relationship with respect to the flange 64 and a portion 86 which is disposed in substantially parallel relationship with respect to the portion 70 of the flange 64, while the stiffening member 82 includes a portion 88 which is disposed in substantially parallel relationship with respect to the flange 66 and a portion 90 which is disposed in substantially parallel relationship with respect to the angularly outwardly extending portion 72 of the flange 66. A connecting member 92 is provided which extends transversely of the support member 66 intermediate the web 68 and the angularly outwardly extending portions 70 and 72 of the flanges. The connecting member 92 includes a head portion 94 which engages the stiffening member 80. The connecting member 92 also includes a shank portion 96 which extends through the stiffening members 80 and 82 and the flanges 64 and 66, and the connecting member 92 is retained by a nut 98 which threadably engages the end portion of the shank 96 remote from the head 94 thereof. The connecting member 92 functions to maintain the flanges 64 and 66 in predetermined spaced relationship and also serves to support a guide member 100. The guide member 100 includes a pair of hook portions 102 and 104 and a bight portion 106 which serves to guide a cable 108, as will be described hereinafter in greater detail.

For the purpose of mechanically joining the individual sections of the trolley duct in end-to-end relationship, a plurality of connectors 110 are provided which overlap the adjacent sections of the trolley duct. Each of the connectors 110 includes a generally U-sectioned inner element 112 and a generally U-sectioned outer element 114. The inner element 112 includes a pair of spaced substantially parallel flanges 116 and 118 integrally joined by a web portion 120, while the outer element 114 includes a pair of spaced substantially parallel flanges 122 and 124 integrally joined by a web 126. The distance between the outer surfaces of the flanges 116 and 118 of the inner element 112 is less than the distance between the inner surfaces of the flanges 122 and 124 of the outer element 114, and, as shown in Figs. 4 and 5, the flanges 122 and 124 are adapted to engage the lower ends of the side walls 32 and 34 of the housing 30 at a position adjacent the junction of the side walls 32 and 34 with the flanges 38 and 40, respectively. The inner elements 112 of the connectors 110 are disposed in the housing 30 so as to straddle the slot 46, the free ends of the flanges 116 and 118 being adapted to engage the inner sides of the flanges 38 and 40. A plurality of screws 130 are provided which extend through the web portions 126 of the outer elements and threadably engage the web portions 120 of the inner elements 112. With such a construction, when the screws 130 are tightened, the flanges 38 and 40 of the housing are clamped between the flanges 116 and 118 of the inner element 112 and the web 126 of the outer element 114.

In the assembly of the sections of the trolley duct, one end portion of the connecting member is secured to one end portion of the housing 30, in the manner previously described, after which the adjacent section of the housing is slidably inserted in the other end portion of the connecting member so that the flanges 38 and 40 of the housing are disposed between the inner and the outer elements of the connector, in the manner previously described. The screws 130 are then tightened so as to securely clamp the adjacent sections of the trolley duct in end-to-end relationship.

Any desired or conventional means may be provided for electrically connecting the conductors 48 and 50 of the adjacent sections of the trolley duct. For example, conventional pins 132 may be utilized, the pins 132 being inserted in the end portions of the conductors 48 and 50 in the conventional manner.

In order to facilitate the installation of the trolley ducts, a guide block 134 is provided which is adapted to be secured to the free end of the leading section 136 of the trolley duct. The guide block 134 includes a body portion 138 having a flange 140 projecting outwardly from the lower edge thereof. The guide block 134 also includes a head portion 142 which is integrally joined to the body portion 138 and the transverse dimensions of which are less than the transverse dimensions of the body portion 138. At a position intermediate the head portion 142 and the body portion 138, a pair of guideways 144 and 146 are provided. Each of the guide ways 144 and 146 includes a converging section 148 and a substantially straight section 150, the sections 150 being of substantially the same configuration as the grooves 54 and 56 in the housing 30. A passageway 158 is also provided in the head portion 142 of the guide block 134, the passageway 158 being open at each end and adapted to receive the cable 108. A retaining element 160 is releasably secured to the guide block 134, as by screws 161 so as to secure the end 162 of the cable to the guide block 134 so that the guide block 134 and the trolley duct may be pulled through the agency of the cable 108.

In securing the guide block 134 to the free end of the leading section 136 of the trolley duct, the flange 140 of the guide block is inserted intermediate the side walls 32 and 34 of the housing 30 so that the bottom wall 164 of the flange 140 engages the inner surfaces of the flange portions 38 and 40 of the housing, and the flanges 38 and 40 of the housing are clamped between the flange 140 of the guide block and a retaining element 166 having a knurled surface 168 which engages the outer surfaces of the flange portions 38 and 40 of the housing. Screws 170 are provided which extend through the retaining element 166 and threadably engage the flange 140 of the guide block 134 to effect the clamping of the guide block to the trolley duct.

When the guide block 134 is mounted on the trolley duct, the sections 150 of the guideways 144 and 146 are aligned with the grooves 54 and 56, respectively, the upper surfaces 172 and 174 of the guideways 144 and 146 being substantially coplanar with the ways 58 and 60 and constituting a continuation thereof.

In the installation of the electrical power system, the support members 62 are secured to a roof truss 173 or other suitable stationary supporting structure at spaced intervals and in aligned relationship along the proposed rows of trolley ducts, the support members 62 being fixed to the roof truss, for example, by bolts 175 which pass through the truss and the web portion 68 of the support member and threadably engage a nut 176. The hook portions 102 and 104 of the guide elements 100 are hooked over the connecting member 92 of each of the support members 62 so that the bight portion 106 is disposed downwardly therefrom. The cable 108 is then passed through the guide elements 100, as shown in Fig. 6, after which the free end of the cable is passed through the passageway 158 in the guide block and secured by the member 160 to the guide block. The cable extends along the proposed row of trolley duct and a winch or other suitable means is provided at the opposite end of the cable remote from the guide block to facilitate pulling the cable.

The guide block 134 is secured to the leading end of the first section 136 of the trolley duct, in the manner previously described. The opposite end of the first section 136 of the trolley duct is then electrically and mechanically connected to another section of the trolley duct in end-to-end relationship, the mechanical connection being effected by sliding the clamping member 110 onto the housing 30 of each section so that the flanges 38 and 40 are disposed intermediate the inner and outer elements 112 and 114 of the clamping member 110. The bolts 130 are then tightened to complete the clamping of the adjacent sections. At the same time, the pins 132 may be slidably inserted in the conductors 48 and 50 in the conventional manner to electrically connect the adjacent sections. The individual sections of the trolley duct are preferably joined at one location, such as at one end of each proposed row of duct, thereby obviating the necessity of the workman moving from such location during the assembly of the duct.

After the first two sections have been secured together in end-to-end relationship, such sections are pulled toward the nearest support member 62. As the guide block 134 approaches the first support member, the guide elements 100 tend to raise the guide block 134 toward the rotatable elements 74 and 76. It will be appreciated that with an elongate section of trolley duct, the end being pulled by the cable will tend to deflect downwardly away from the support members 30, and the guide elements 100 serve to guide the guide block 134 toward the rotatable elements of the support members. The converging portions 148 of the guide ways 144 and 146 initially engage the rotatable elements 74 and 76, respectively. As the guide block moves over the rotatable elements 74 and 76, the ways 144 and 146 align the ways 58 and 60 of the housing with the rotatable elements of the support members, with the result that the ways 58 and 60 easily move into engagement with the rotatable elements as the sections of the trolley duct move longitudinally relative to the support member 62. The rotatable elements 74 and 76, thus, rotatably support the initially joined sections of the trolley duct. The remaining sections of the trolley duct are then successively electrically and mechanically joined to the previously joined sections, and the joined sections are pulled by the cable 108 through the support members 62, the guide block 134 effecting the initial engagement with the rotatable elements of each support member and aligning the ways 58 and 60 with the rotatable elements 74 and 76. As the guide block 134 enters the support member 62, the guide member 100 is pulled free of the transverse member 92 by the guide block 134, one or both of the hook portions 102 and 104 opening to permit this. The guide member 100 may thereafter remain hanging from the connecting member 92 by one end or it may catch on the cable 108, or, in some cases, fall to the floor.

After all of the sections of the trolley duct have been joined together and pulled into engagement with the rotatable elements of the support members, the cable 108, the guide block 134 and the guide elements 100 may be removed and reused. This is possible since the distortion of the hook members 102 and 104 is ordinarily not such as to interfere with its subsequent re-use. The conductors 48 and 50 may, of course, be electrically connected to a suitable source of potential in any desired manner. The light fixtures 24 or other electrical equipment may be installed during the assembly of the trolley duct or may be installed after the trolley duct is in its final position. The method of installing electrical distribution equipment as described herein is claimed in my copending divisional application Serial Number 636,093, filed January 24, 1957, assigned to the same assignee as the present invention. Certain additional aspects of the invention including the construction of guide block 134 are claimed in my copending divisional application Serial Number 636,094, filed January 24, 1957, now Patent No. 2,913,818, and assigned to the same assignee as the present invention.

While a preferred embodiment of the invention has been shown and described, it will be understood that various changes and modifications may be made without departing from the spirit of the invention.

What I claim as new and desire to secure by Letters Patent of the United States is:

1. In an electrical system, the combination comprising a plurality of spaced aligned support members, at least one rotatable element carried by each of said support members, an elongate electrical duct including a plurality of sections joined together in end-to-end relationship, each of said sections including a housing having at least one longitudinally extending guide surface extending in alignment with a corresponding guide surface of adjacent sections, a plurality of longitudinally extending parallel bus bar conductors supported in insulated relation within each of said sections and connected to corresponding bus bars of the adjacent sections, said duct being supported on said support members by engagement of said guide surface of said housing with said rotatable element for free-rolling movement thereon relative to said support members whereby said duct is supported for free-rolling movement relative to said support members in the direction of the length of said duct.

2. In an electrical system, the combination comprising a plurality of spaced aligned support members, at least one rotatable element carried by each of said support members, and an elongate electrical duct including a plurality of sections joined together in end-to-end relationship, each of said sections including a housing having at least one longitudinally extending guide surface extending in alignment with a corresponding guide surface of adjacent sections, a plurality of elongate electrical conductors supported in parallel insulated relation in said housing, said housing having access means along at least one wall thereof for the insertion of power take-off devices intermediate the ends of each of said sections to draw power from said conductors, said duct being supported on said support members by engagement of said guide surface with said rotatable element for free-rolling movement relative to said support members in the direction of the length of said duct.

3. In an electrical ssytem, the combination comprising a plurality of spaced aligned support members, a pair of spaced rotatable elements carried by each of said support members, an elongate duct including a plurality of sections, each of said sections including a housing having a pair of spaced ways thereon and a pair of spaced substantially mutually coplanar flanges in spaced relationship with respect to said ways, said elements being in rolling engagement with said ways and supporting said duct, and a plurality of connectors engaging said flanges and joining said sections in end-to-end relationship.

4. In an electrical system, the combination comprising a plurality of spaced aligned support members, a pair of spaced rotatable elements carried by each of said support members, an elongate duct including a plurality of sections, each of said sections including a housing having a pair of spaced ways thereon and a pair of spaced substantially mutually coplanar flanges in spaced relationship with respect to said ways, said elements being in rolling engagement with said ways and supporting said duct, a plurality of connectors engaging said flanges and joining said sections in end-to-end relationship, each of said connectors including a pair of substantially U-sectioned elements, the transverse dimensions of one of said elements being less than the transverse dimensions of the other of said elements, and means releasably joining said elements in spaced confronting relationship.

5. In an electrical system, a plurality of spaced, aligned support members, a rotatable element carried by each of said support members, an elongate electrical duct including a plurality of sections each having a housing provided with a way thereon, a plurality of electrical fixtures mechanically suspended from and electrically connected to said duct sections, said rotatable elements engaging said ways for free rolling movement relative thereto and supporting said duct and fixtures.

6. In an electrical system, a plurality of elongate electrical duct sections each including a housing having a pair of spaced ways thereon, means mechanically and electrically connecting said sections in end-to-end relationship with said ways in mutual alignment, a plurality of lighting fixtures suspended from said sections, and a plurality of spaced, aligned support members each having a pair of spaced rotatable elements engaging said ways for supporting said duct and fixtures and for permitting movement thereof relative to said supporting members.

7. A support member for use in supporting a duct in an electrical system, said support member including a pair of spaced flange portions integrally joined by a web portion, a pair of rotatable elements, one of said rotatable elements being journaled to each flange portion of said support member, the axes of rotation of said elements being disposed in substantially mutually perpendicular relationship, and a connecting member extending between said flange portions of said support member in spaced substantially parallel relationship with respect to the web portion thereof, said connecting member being adapted to maintain said flange portions in predetermined spaced relationship.

References Cited in the file of this patent

UNITED STATES PATENTS

| | | |
|---|---|---|
| 666,361 | Smead | Jan. 22, 1901 |
| 1,097,273 | Tyler | May 19, 1914 |
| 1,541,129 | Farley | June 9, 1925 |
| 2,571,832 | Chapin | Oct. 16, 1951 |